Sept. 21, 1943.  L. W. BLAU  2,330,026

GEOCHEMICAL PROSPECTING

Filed Nov. 25, 1940

Ludwig W. Blau INVENTOR.

BY P. J. Whelan
Atty.

Patented Sept. 21, 1943

2,330,026

UNITED STATES PATENT OFFICE 2,330,026

GEOCHEMICAL PROSPECTING

Ludwig W. Blau, Houston, Tex., assignor to Standard Oil Development Company, a corporation of Delaware Application November 25, 1940, Serial No. 366,950

6 Claims. (Cl. 88—14)

The present invention is directed to a method of geochemical prospecting for subterranean petroliferous deposits and particularly to that method in which hydrocarbon-consuming bacteria in the soil are relied upon as indicators of subterranean petroliferous deposits.

The present invention is based on the discovery that hydrocarbon-consuming bacteria or products of their action on hydrocarbons absorb certain wave lengths of light. That is to say, when light is passed through a liquid containing hydrocarbon-consuming bacteria which have been subjected to a hydrocarbon atmosphere, certain wave lengths of the light are absorbed selectively. These wave lengths are a band ranging from about 5050 to 5200 Angstroms and a band ranging from about 5250 to 5450 Angstroms. In other words, the absorption curve of light passed through a liquid containing these bacteria shows a double hump, the one having its peak at about 5150 Angstroms and the other having its peak at about 5400 Angstroms. This double hump seems to be peculiar to the absorption curve of cultures of these bacteria.

In the practice of the present invention, soil samples are collected at spaced points over an area to be explored. These soil samples are preferably collected as near the surface as possible. Generally, the grass and roots at the surface are scraped away and the samples collected immediately below this vegetation. Samples may be collected at depths up to about two feet, but their content of hydrocarbon-consuming bacteria decreases with depth.

The samples are separately analyzed by first being extracted with a solution which will wash out of the samples the hydrocarbon-consuming bacteria and/or the organic materials which are formed by the action of the bacteria on hydrocarbons. A suitable chemical for this extraction may be a water solution of an alkali metal salt which has an oxidizing action, such as sodium peroxide, sodium perborate, potassium dichromate, etc. Other chemicals, such as inorganic acids may be employed. The same amount of sample by weight and the same volume of extracting medium is used for the preparation of each extract.

The extract so obtained is then placed in a light beam and the transmitted light is caused to impinge on a grating spectrograph. A film is exposed to the light reflected from the grating and shows lines of various wave lengths. The capacity or intensity of these lines is then determined in the usual manner by placing the film between a light source and a photocell and measuring the current in the photocell circuit.

It is to be emphasized here that it has not been established whether or not the absorption of certain wave lengths by the extract is due to the presence in the extract of hydrocarbon-consuming bacteria or to the organic compound or compounds which result from the action of the bacteria on hydrocarbons, such as ethane, propane, butane, etc. For this reason, the effect produced will be referred to hereinafter as the absorption of certain wave lengths of light by an extract of a soil sample containing hydrocarbon-consuming bacteria which have been subjected to the action of hydrocarbons.

The nature of the method of the present invention will be more clearly understood from the following detailed description of the accompany drawing in which Fig. 1 is a schematic view of the apparatus used in the practice of the present invention;

Figure 1:
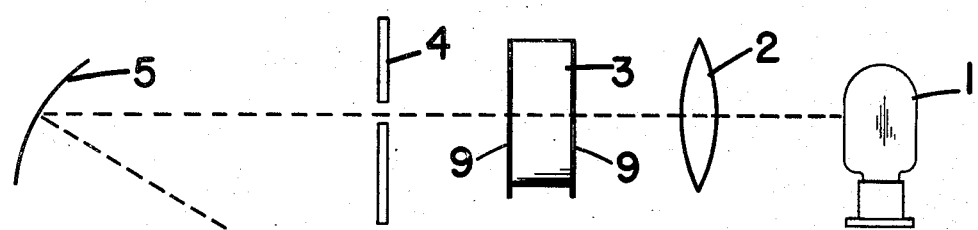
Figure 2:
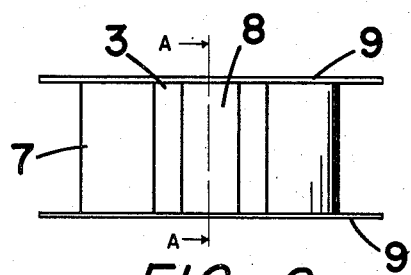
Fig. 2 is a plan view of the cell used for holding the extract.
Figure 3:
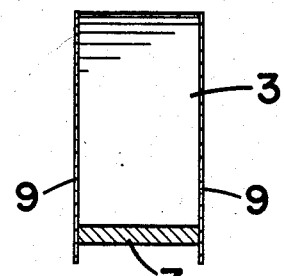
Fig. 3 is a longitudinal vertical section of said cell.

Referring to Fig. 1 in detail, numeral 1 designates an incandescent lamp, 2 is a condensing lens, 3 is an absorption cell for holding the extract to be examined, 4 is a slit, 5 is a grating of a grating spectrograph, 6 is a photographic film. It will be noted that both the grating and the film are curved in the manner conventional in grating spectrographs. The construction of absorption cell 3 is important to the operability of the method. This cell has transparent end walls, each of which is made of optically perfect glass, such as microscope slides. These end walls must be perfectly parallel. In the specific embodiments shown, the cell comprises a section 7 of a Bakelite tube having a cut-away portion 8 at the top for the introduction of the sample and having end walls 9 which are perfectly parallel and are glued to the ends of the section 7. The Bakelite used in opaque and dark to reduce the scattering of the light passing through the cell.

Figure 4:
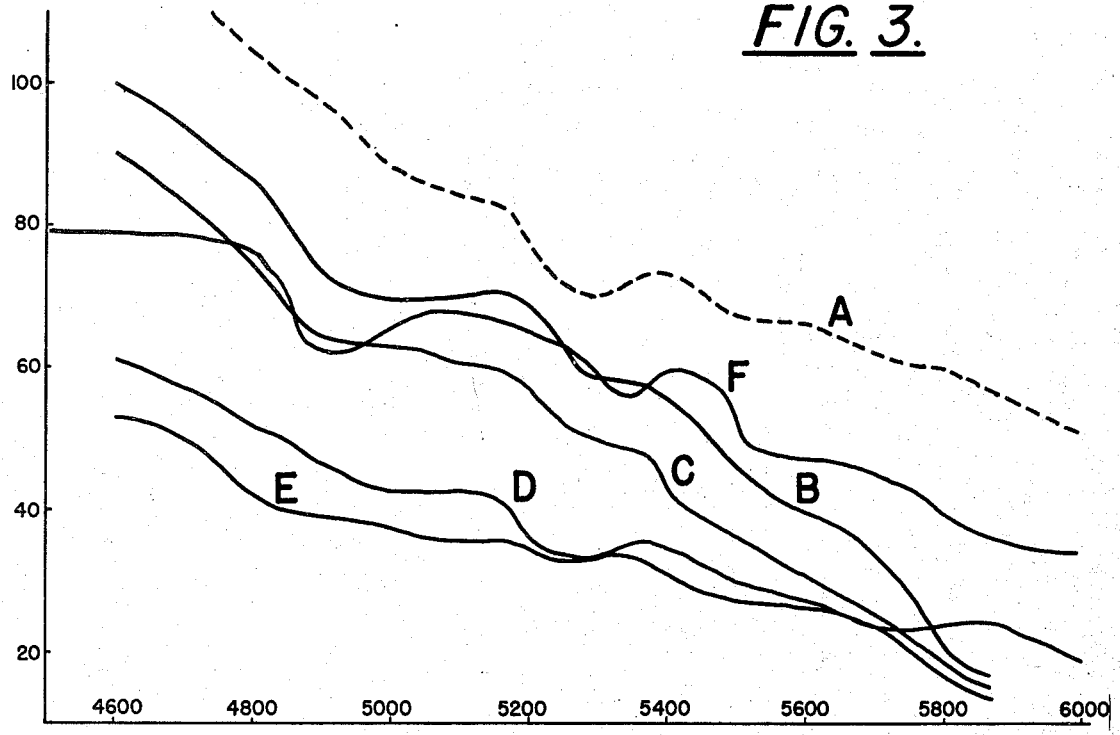
Fig. 4 is a family of curves obtained by the practice of the present invention on soil samples obtained over a known oil field, including a curve obtained by the practice of the present invention upon a cultivated culture of hydrocarbon-consuming bacteria.

In Fig. 4 is shown a family of curves obtained by examination of extracts of samples obtained over a known oil field by the method of the present invention. These extracts were made by treating the samples with a 3% aqueous solution of sodium peroxide. The extracts were of a reddish brown color of different intensities. In examining these samples according to the present invention an equal volume of each was exposed to the light for precisely the same number of seconds. Likewise, the film in each case was exposed for the same length of time and was subjected to a developer for the same length of time at the same temperature, so that the results were comparable.

In Fig. 4 the wave lengths of light in Angstroms are shown as abscissa and the meter readings of the photometer are shown as ordinates. It may be mentioned here that these are not the actual meter readings, but are meter readings corrected for the variation in sensitivity of the film for different wave lengths, as explained by Harrison in his paper on Spectrophotometry in the March 1934 Journal of the Optical Society of America. The curves are identified as A, B, C, D, and E to indicate different samples. There is also a curve F obtained by the application of the method of the present invention to a sodium peroxide extract of a cultivated culture of hydrocarbon-consuming bacteria which have been fed with ethane. It will be seen that in every case there was a hump in the band of wave lengths beginning with about 5050 and extending to about 5250 Angstroms, and a second hump beginning at about 5300 and extending to about 5500 Angstroms. The difference in vertical position of the various curves is an indication of the translucence of the extracts from which the curves were made, the lighter colored extracts giving a curve occupying a lower position than the darker colored extracts.

It will be apparent that changes in the procedure from the specific method outlined above can be adopted without departing from the scope of the present invention. It may be mentioned that light source I may be any light source which emits wave lengths in the range in which anomalies occur as shown in Fig. 4. An ordinary incandescent lamp is well suited for this purpose. The higher powered the lamp, the better are the results.

The nature and objects of the present invention having been thus described and illustrated, what is claimed as new and useful and is desired to be secured by Letters Patent is:

1. A method for prospecting for subterranean petroliferous deposits which comprises collecting soil samples at spaced points over an area to be explored at a depth at which aerobic bacteria can exist, forming an extract of each sample containing a product of the action of any hydrocarbon-consuming bacteria that may have been in the sample on hydrocarbons, and determining the absorption power of each extract for light including a band of wave lengths ranging from about 4600 to 6000 Angstroms whereby the results of such determinations may be correlated with sample locations to produce a picture from which the presence of subsurface deposits of oil may be prognosticated.

2. A method according to claim 1 in which the extract is formed by washing the sample with a dilute aqueous solution of an alkali metal compound having an oxidizing action.

3. A method according to claim 1 in which the samples are collected just below surface vegetation.

4. A method for prospecting for subterranean petroliferous deposits which comprises collecting soil samples at spaced points over an area to be explored at a depth at which aerobic bacteria can exist, extracting each sample with a liquid capable of extracting any product of the action of any hydrocarbon-consuming bacteria that may have been in the sample on hydrocarbons, and determining the absorption power of each extract for light including a band of wave lengths ranging from about 4,600 to 6,000 Angstroms, whereby the results of such determinations may be correlated with sample locations to produce a picture from which the presence of subsurface deposits of oil may be prognosticated.

5. A method for prospecting for subterranean petroliferous deposits which comprises collecting soil samples at spaced points over an area to be explored at a depth at which aerobic bacteria can exist, extracting each sample with a dilute aqueous solution of an alkali metal compound having an oxidizing action, and determining the absorption power of each extract for light including a band of wave lengths ranging from 4,600 to 6,000 Angstroms, whereby such determinations may be correlated with sample locations to produce a picture from which the presence of subsurface deposits of oil may be prognosticated.

6. A method according to claim 5 in which the extracting agent is a dilute aqueous solution of sodium peroxide.

LUDWIG W. BLAU.